United States Patent
Haydt et al.

(10) Patent No.: US 11,293,862 B2
(45) Date of Patent: Apr. 5, 2022

(54) MULTIPLE CONTAMINANTS NATURAL GAS ANALYSER

(71) Applicant: GALVANIC APPLIED SCIENCES INC., Calgary (CA)

(72) Inventors: David D. Haydt, Calgary (CA); Michael B. Frish, Andover, MA (US); Shin-Juh Chen, Andover, MA (US); Nicholas F. Aubut, Andover, MA (US)

(73) Assignee: GALVANIC APPLIED SCIENCES INC., Calgary (CA)

( * ) Notice: Subject to any disclaimer, the term of this patent is extended or adjusted under 35 U.S.C. 154(b) by 0 days.

(21) Appl. No.: 17/197,794

(22) Filed: Mar. 10, 2021

(65) Prior Publication Data
US 2021/0285873 A1  Sep. 16, 2021

Related U.S. Application Data

(60) Provisional application No. 62/987,668, filed on Mar. 10, 2020.

(51) Int. Cl.
*G01N 21/25* (2006.01)
*G01N 21/39* (2006.01)

(52) U.S. Cl.
CPC .......... *G01N 21/39* (2013.01); *G01N 21/255* (2013.01); *G01N 2201/06113* (2013.01)

(58) Field of Classification Search
CPC .... G01N 21/03; G01N 21/253; G01N 21/251; G01N 21/27; G01N 21/255
USPC .......................................................... 356/409
See application file for complete search history.

(56) References Cited

U.S. PATENT DOCUMENTS

| | | | |
|---|---|---|---|
| 6,953,487 B2 * | 10/2005 | Cliche | G01N 21/03 |
| | | | 136/255 |
| 7,586,094 B2 | 9/2009 | Liu et al. | |
| 7,705,988 B2 | 4/2010 | Richman | |
| 9,000,375 B2 | 4/2015 | Little, III et al. | |
| 9,057,718 B2 | 6/2015 | Little, III | |
| 9,784,674 B2 | 10/2017 | Miron | |
| 9,983,126 B2 | 5/2018 | Kotidis et al. | |
| 10,228,324 B2 | 3/2019 | Zemek et al. | |
| 2018/0059003 A1 | 3/2018 | Jourdainne | |
| 2019/0170638 A1 | 6/2019 | Huang | |

* cited by examiner

*Primary Examiner* — Md M Rahman
(74) *Attorney, Agent, or Firm* — Renner, Otto, Boisselle & Sklar, LLP (57) ABSTRACT

Systems and method for analysing contaminants of a gas sample of natural gas are provided. An interrogation light beam propagates into a chamber of a multipass gas cell receiving the gas sample. The interrogation light beam has a wavelength controlled to alternately correspond to an absorption wavelength of $H_2S$ and an absorption wavelength of an additional gas contaminant. The additional gas contaminant may for example be $CO_2$ or $H_2O$. In some implementation, a single laser emitter may be used to generate the interrogation light beam at the $H_2S$ and $CO_2$ wavelengths. In some implementations, two different laser emitters may be used to generate the interrogation light beam at the $H_2S$ and $H_2O$ wavelengths. A WMS detection scheme may be used.

32 Claims, 6 Drawing Sheets

MULTIPLE CONTAMINANTS NATURAL GAS ANALYSER

TECHNICAL FIELD

The technical field generally relates to devices and methods for use in analysing contaminants in natural gas, and in particular to a single device enabling the detection of different gas species using a same gas cell.

BACKGROUND

Natural gas is typically extracted from wells and processed in processing plants, where it is refined and treated. An important portion of the natural gas treatment is the removal of contaminants. Purity of the final product is generally measured at the custody transfer point of the gas from the extractor to a transmission company, between transmission companies, or from the transmission company to a distribution network. Tariff agreements between the different players define quality objectives that the transferred products are required to meet, including acceptable threshold levels for contaminants of different types.

Among potential contaminants of natural gas, the monitoring of hydrogen sulfide ($H_2S$) is of particular importance as it is poisonous, corrosive and flammable, and therefore poses a substantial risk. The presence of carbon dioxide ($CO_2$) and water vapor ($H_2O$) may also, however, be of interest. The concentration of carbon dioxide in the final product needs to be limited as it is considered an inert component which does not contribute to the heating vale of the gas. The measurement of water vapor is also relevant as it is a contributor to corrosion in pipelines and associated equipment.

It is known to use optical techniques to measure the concentration of contaminants of natural gas, such as for example evaluating the spectroscopic absorption of light by $H_2S$ molecules and deducing the amount of this species present in a sample. This approach is however very specific to the targeted gas species. In general, the measurement of different contaminants is performed using separate analysers using different techniques.

There remains a need for improvements in the techniques for measuring the concentration of multiple contaminants in natural gas.

SUMMARY

In accordance with one aspect, there is provided a gas analyser for analysing multiple contaminants in a gas sample of natural gas. The gas analyser includes:
a laser module comprising:
  a first laser emitter, operable within a spectral range encompassing a selected $H_2S$ absorption wavelength and a selected $CO_2$ absorption wavelength;
  a second laser emitter, operable within a spectral range encompassing a selected $H_2O$ absorption wavelength; and
  an output optical coupler optically coupled to the first and second laser emitters and configured to output an interrogation light beam;
a controller configured to send control signals to the laser module, said control signals operating the first and second laser emitters to alternately output, as the interrogation light beam:
  light from the first laser emitter at the selected $H_2S$ absorption wavelength;
  light from the first laser emitter at the selected $CO_2$ absorption wavelength; and
  light from the second laser emitter at the selected $H_2O$ absorption wavelength;
a multipass gas cell defining a chamber configured to receive the gas sample, the multipass gas cell having a light input optically coupled to the laser module to inject the interrogation light beam inside said chamber, and a light output for extracting the interrogation light beam from the chamber after multiple passes across said chamber; and
a photodetector operatively connected to the light output of the multipass gas cell to receive the interrogation light beam therefrom.

In some implementations, the selected $H_2S$ absorption wavelength is 1574.55 nm, the selected $CO_2$ absorption wavelength is 1574.40 nm and the selected $H_2O$ absorption wavelength is 1486.71 nm.

In some implementations, each of the first and second laser emitter is one of a distributed feedback laser, a quantum cascade laser and a Vertical Cavity Surface Emitting Laser.

In some implementations, the laser module comprises first and second laser drivers respectively coupled to the first and second laser emitters.

In some implementations, wherein the control signals are configured to scan a wavelength of the first and second laser emitters across the selected absorption wavelength.

In some implementations, the control signals are configured to modulate an intensity of light from the first and second laser emitters.

In some implementations, the gas analyser comprises an optical fiber link guiding the interrogation light beam from the laser module to the multipass gas cell, and the laser module comprises first and second optical fiber sub-links respectively connecting the first and second laser emitters to the output optical coupler.

In some implementations, the multipass gas cell is a Herriott cell.

In some implementations, the photodetector is a photodiode.

In some implementations, the gas further comprises a signal processor in communication with the photodetector and configured to receive detection signals therefrom and process said detection signals to extract information relative a concentration of each of $H_2S$, $CO_2$ and $H_2O$ in the gas sample.

In accordance with another aspect, there is provided a gas analyser for analysing contaminants in a gas sample of natural gas, the gas analyser comprising:
a spectrally tunable laser emitter operable to emit an interrogation light beam at an operation wavelength within a spectral range encompassing a first wavelength corresponding to an absorption wavelength of $H_2S$ and a second wavelength corresponding to an absorption wavelength of an additional contaminant of natural gas;
a controller configured to send control signals to the laser emitter to alternately output light at the first and second absorption wavelengths as the interrogation light beam;
a multipass gas cell defining a chamber configured to receive the gas sample, the multipass gas cell having a light input optically coupled to the laser emitter to inject the interrogation light beam inside said chamber, and a light output extracting the interrogation light beam from the chamber after multiple passes across said chamber; and a photodetector operatively connected to the light output of the multipass gas cell to receive the interrogation light beam therefrom.

In some implementations, the first wavelength corresponding to an $H_2S$ absorption wavelength is one of 1574.55 nm, 1578.13 nm and 1589.76 nm.

In some implementations, the additional contaminant is $CO_2$, and the second wavelength corresponding to an absorption wavelength of said additional contaminant is 1574.40 nm.

In some implementations, the control signals are configured to scan the operation wavelength of the laser emitter across the first or the second wavelength.

In some implementations, the control signals comprise:
i. a first set of laser tuning parameters for modulating the operation wavelength around the first wavelength; and
ii. a second set of laser tuning parameters for modulating the operation wavelength around the second wavelength.

In some implementations, the first and second sets of laser tuning parameters control one of a temperature of the laser emitter and a drive current of the laser emitter.

In some implementations, the gas analyser further comprises a signal processor in communication with the photodetector and configured to receive detection signals therefrom and process said detection signals to extract information relative a concentration of $H_2S$, and of the additional contaminant in the gas sample.

In accordance with yet another aspect, there is provided a gas analyser for analysing contaminants of a gas sample of natural gas, the gas analyser comprising:
a laser module comprising:
a first laser emitter operable at an absorption wavelength of $H_2S$; and
a second laser emitter operable at an absorption wavelength of an additional gas contaminant;
a controller configured to send control signals to the laser module, said control signals alternately operating the first and second laser emitters to output light at the $H_2S$ absorption wavelength or at the absorption wavelength of the additional gas contaminant as an interrogation light beam;
a multipass gas cell defining a chamber configured to receive the gas sample, the multipass gas cell having a light input optically coupled to the laser module to inject the interrogation light beam inside said chamber, and a light output extracting the interrogation light beam from the chamber after multiple passes across said chamber; and
a photodetector operatively connected to the light output of the multipass gas cell to receive the interrogation light beam therefrom.

In some implementations, the absorption wavelength of $H_2S$ is 1574.55 nm, the additional contaminant is $H_2O$, and the absorption wavelength of said additional contaminant is 1486.71 nm.

In some implementations, the control signals are configured to scan an operation wavelength of each of the first and second laser emitters.

In some implementations, the control signals are configured to modulate an intensity of light from each of the first and second laser emitters.

In some implementations, the control signals control one of a temperature of the laser emitter and a drive current of each of the first and second laser emitters.

In some implementations, the gas analyser further comprises a signal processor in communication with the photodetector and configured to receive detection signals therefrom and process said detection signals to extract information relative a concentration of $H_2S$, and of the additional contaminant in the gas sample.

In accordance with another aspect, there is provided a method for analysing contaminants of a gas sample of natural gas, the method comprising the steps of:
a) inserting the gas sample into a chamber of a multipass gas cell;
b) propagating an interrogation light beam through the chamber of the multipass cell;
c) controlling a wavelength of said interrogation light beam to alternately correspond to:
an absorption wavelength of $H_2S$; and
an absorption wavelength of at least one additional contaminant;
d) concurrently to said controlling of the wavelength of the interrogation light beam, detecting the interrogation light beam after multiple passes across said chamber, thereby obtaining detection signals; and
e) processing said detection signals to obtain information about concentrations of $H_2S$ and of the at least one additional contaminant in the gas sample.

In some implementations, the $H_2S$ absorption wavelength is one of 1574.55 nm, 1578.13 nm and 1589.76 nm.

In some implementations, the at least one additional contaminant comprises $CO_2$, and the absorption wavelength of $CO_2$ is 1574.40 nm.

In some implementations, the step of controlling a wavelength of said interrogation light beam comprises, sequentially:
i. operating a laser emitter according to laser tuning parameters selected to generate light at the $H_2S$ absorption wavelength; and
ii. operating the laser emitter according to laser tuning parameters selected to generate light at the $CO_2$ absorption wavelength.

In some implementations, the at least one additional contaminant comprises $H_2O$, and the absorption wavelength of $H_2O$ is 1486.71 nm.

In some implementations, step of controlling a wavelength of said interrogation light beam comprises, sequentially:
i. operating a first laser emitter according to laser tuning parameters selected to generate light at the $H_2S$ absorption wavelength; and
ii. operating a second laser emitter according to laser tuning parameters selected to generate light at the $H_2O$ absorption wavelength.

In some implementations, the step of c) controlling a wavelength of said interrogation light beam comprises, sequentially, the substeps of:
i. operating a first laser emitter according to laser tuning parameters to generate light at the $H_2S$ absorption wavelength;
ii. operating the first laser emitter according to laser tuning parameters selected to generate light at a $CO_2$ absorption wavelength; and
iii. operating a second laser emitter according to laser tuning parameters selected to generate light at a $H_2O$ absorption wavelength.

In some implementations, the $H_2S$ absorption wavelength is 1574.55 nm, the $CO_2$ absorption wavelength is 1574.40 nm and the $H_2O$ absorption wavelength is 1486.71 nm.

In some implementations, the step of c) controlling a wavelength of said interrogation light beam comprises imposing a sinusoidal modulation on said wavelength.

Other features and advantages will be better understood upon reading of embodiments there of with reference to the appended drawings.

DETAILED DESCRIPTION

The present description concerns devices and methods for analysing multiple constituents of a gas sample using absorption spectroscopy.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the present description, the term "about" means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

In the present description, when a broad range of numerical values is provided, any possible narrower range within the boundaries of the broader range is also contemplated. For example, if a broad range value of from 0 to 1000 is provided, any narrower range between 0 and 1000 is also contemplated. If a broad range value of from 0 to 1 is mentioned, any narrower range between 0 and 1, i.e. with decimal value, is also contemplated.

In some implementations, the devices and methods described herein may be of particular interest in the context of analysis of molecular species in natural gas. Natural gas is mainly composed of methane, but also includes contaminants, such as hydrogen sulfide ($H_2S$), carbon dioxide ($CO_2$), and water vapor ($H_2O$), and the like. As mentioned above, it is of particular interest to the natural gas industry to evaluate the presence of contaminants and measure their concentration.

In accordance with one aspect, the devices and methods described herein preferably provide for the evaluation of the concentration of hydrogen sulfide ($H_2S$) in natural gas, along with at least one other contaminant. In some variants, the devices and method described herein additionally provide for the evaluation of the concentration of either water vapor ($H_2O$) or carbon dioxide ($CO_2$), or of both these gas species.

As mentioned above, the devices and methods described herein make use of absorption spectroscopy. The expression "absorption spectroscopy" refers to a technique measuring the absorption of light by a sample as a function of the optical frequency, or wavelength, of the absorbed light. Different gas species have known absorption spectra, each defining a plurality of absorption lines of various strength. Probing a gas with a laser beam tuned to a known absorption line of a target analyte species allows one to determine the presence of this analyte in the gas sample and measure its concentration.

Figure 1:
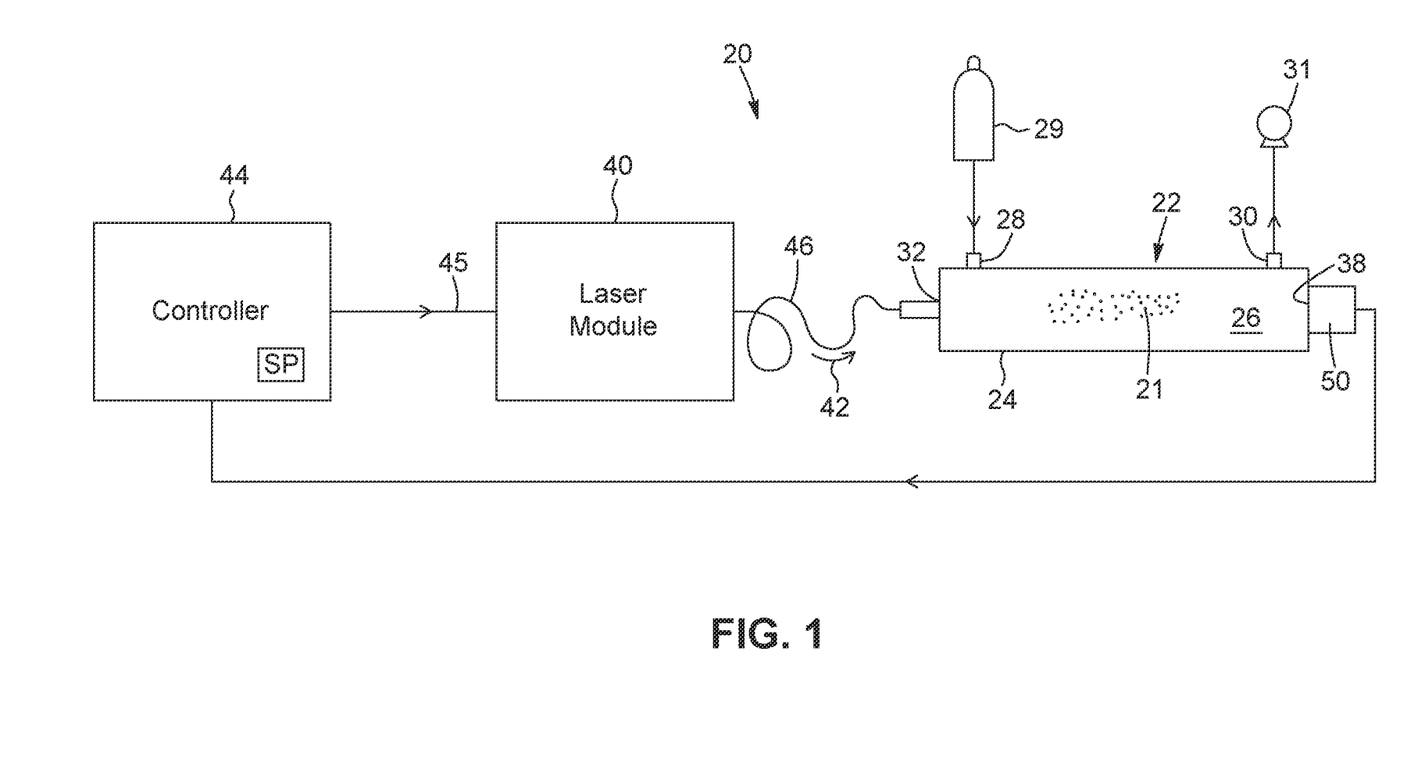
FIG. 1 is a schematized diagram of a gas analyser according to one embodiment.

Referring to FIG. 1, a gas analyser 20 for analysing multiple contaminants in a gas sample of natural gas according to one embodiment is schematically illustrated. It will be readily understood throughout the present description that reference to multiple contaminants can apply to two contaminants of different gas species or more. The gas analyser 20 broadly includes a laser module 40, a gas cell 22 and a controller 44. The laser module 40 is configured to generate an interrogation light beam 42. The controller 44 provides control signals 45 to the laser module 40 in order to control the wavelength of the interrogation light beam 42, as explained further below. Preferably, the gas analyser 20 further includes an optical fiber link 46 guiding the interrogation light beam 42 from the laser module 40 to the gas cell 22.

The gas cell 22 is configured to receive a sample 21 of the gas to be analysed, preferably natural gas. In some implementations, the gas cell 22 includes a closed wall structure 24 defining a gas chamber 26. In some variants the closed wall structure 24 may have a cylindrical shape, although other shapes may be used without departing from the scope of protection. The gas cell 22 further includes a gas inlet 28 and a gas outlet 30, allowing gas circulation in and out of the gas cell 22. The gas inlet 28 and gas outlet 30 may be disposed at any suitable location on the closed wall structure 24. The gas inlet 28 is configured to receive the sample 21 from a sample source 29 which may be embodied by a pipeline, a sampler or any other means of extracting a sample of natural gas from a point of interest within the natural gas value chain. A pump 31 may be provided downstream of the gas outlet 30 to pull the gas sample out of the gas cell 22. Of course, any other components known in the art of gas processing and analysis, such as valves, gauges and the like may also be provided without departing from the scope of protection.

Figure 2:
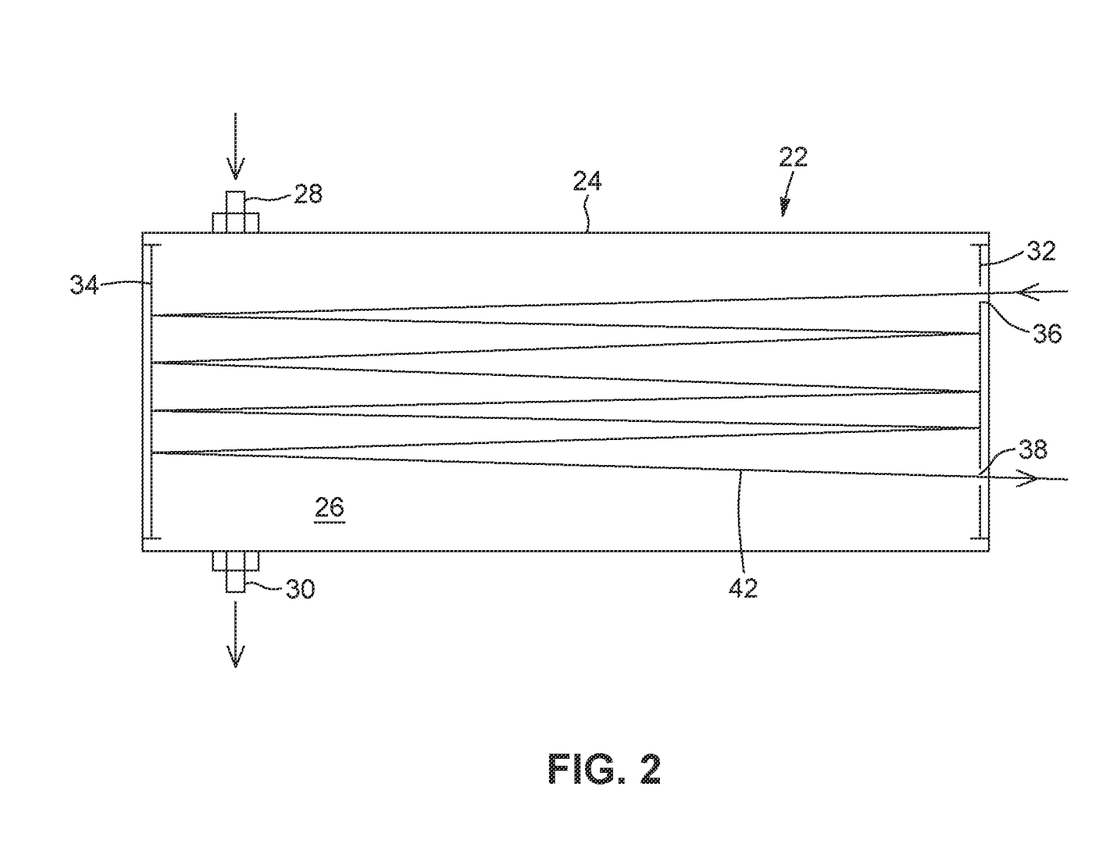
FIG. 2 is a schematized representation of a Herriott cell for use as the gas cell of the analyser of FIG. 1 according to one variant.

With additional reference to FIG. 2, in some implementations the gas cell 22 may be a multipass gas cell. Multipass gas cells are typically used in the art to measure low concentration of gas analytes in a sample by measuring spectroscopic absorption of an interrogation light beam in the cell. The interrogation light beam 42 is reflected back and forth through the cell 22 in order to increase its path length, therefore increasing its probability of being absorbed by gas constituents. In the illustrated embodiment, the multipass gas cell 22 has a configuration known as a "Herriott cell". In such a configuration, the gas cell 22 includes a pair of spherical mirrors 32 and 34 disposed opposite to each other within the closed walled structure 24, such that the interrogation light beam 42 makes multiple passes ("bounces" back and forth) between the spherical mirrors 32 and 34. In some variants, one or more holes may be provided in one or both spherical mirrors 32 and 34 to provide for light input 36 and output 38. In other variants, the light input 36 and/or output 38 may be provided offset from the spherical mirrors 32 and 34.

Although the embodiments illustrated herein show a gas cell having a Herriott configuration, it will be readily understood by one skilled in the art that in other variants different configurations may be used, such as for example a Pfund cell, a White cell or a circular multipass cell.

Referring back to FIG. 1, the gas analyser 20 further includes a photodetector 50 or photosensor operatively connected to the light output 38 of the gas cell 22, in order to receive and detect the interrogation light beam 42 after its passage through the gas cell 22. The photodetector 50 may be embodied by any device or combination of devices enabling the intensity of a light beam to be measured. In some implementations, the photodetector 50 is embodied by a photodiode. In some implementations, the photodetector 50 may be optically coupled to the light output 38 of the multipass gas cell 22 such that the interrogation light beam is detected by the photodetector 50 as it exits the gas cell 22. In other variants, additional optical components such as optical fibers or other waveguides, lenses, mirrors and the like may be used to guide the interrogation light beam 42 between the light output 38 and the photodetector 50.

As explained above, absorption of light by gas species in a sample leads to a reduction of the light intensity of the interrogation light beam at the light output, which is commensurate with the concentration of that gas species within the sample. Gaseous molecules absorb light at specific wavelengths (called absorption lines) according to the Beer-Lambert law, given by equation (1):

$$I_v = I_{v0} \cdot \exp[-S \cdot g(v-v_0) \cdot N \cdot l] = I_{v0} \exp(-\alpha) \quad (1)$$

where $I_v$ is the transmitted intensity of laser radiation of wavenumber v through an absorbing medium, and $I_{v0}$ is the initial light intensity prior to its interaction with the absorbing medium. The exponential term $\alpha$, conventionally called the absorbance, represents the attenuation of $I_{v0}$ by absorption, where S is the strength of an absorption line, $g(v-v0)$ expresses the absorption lineshape, N is the molecular density of absorbing molecules in the gas phase, and l is the path length of the interrogation light beam across the region of absorbing molecules.

Figure 5A:
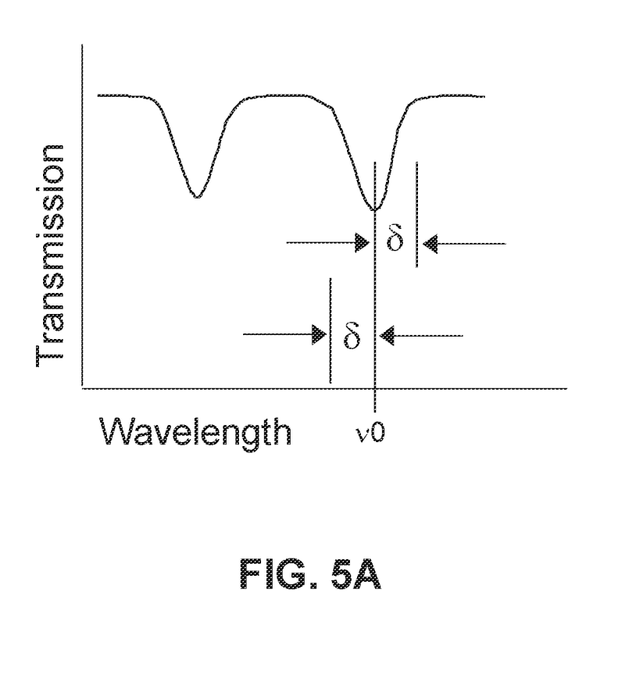
FIGS. 5A and 5B illustrate the principles of Wavelength Modulation Spectroscopy (WMS).
Figure 5B:
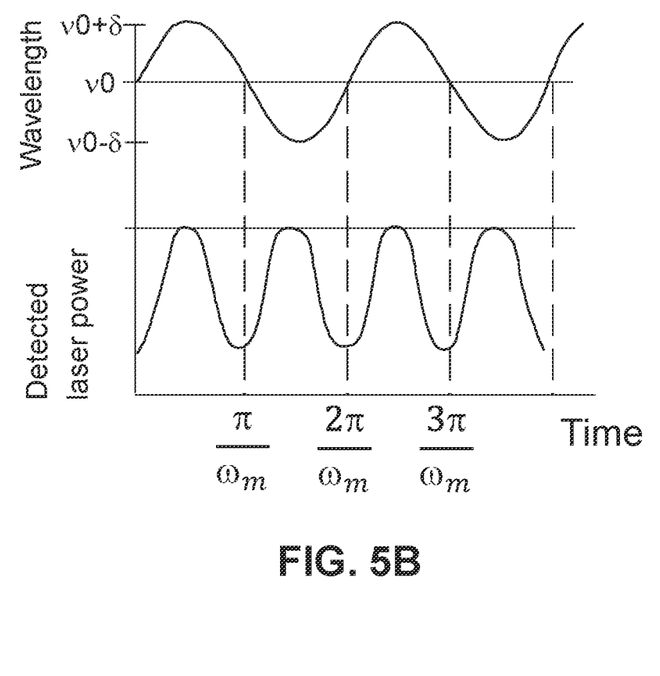

In some implementations, to measure the gas number density or concentration of a contaminant species, the laser wavelength may be scanned repetitively across the selected absorption line of the target analyte. In one embodiment this scan may follow the principles of a well-established sensitive detection technique called wavelength modulation spectroscopy (WMS). FIGS. 5A and 5B illustrate the principles of WMS. The laser wavelength is modulated sinusoidally, at a fixed modulation rate Wm, across the selected absorption line having halfwidth δ. Since the wavelength crosses the absorption line twice for each modulation cycle, the detected laser power contains an amplitude modulation having a periodic component at precisely twice the wavelength modulation rate and fixed in phase relative to the wavelength modulation. Phase-sensitive (lock-in) amplification may be used to measure the amplitude of this component while rejecting noise, providing the exquisite sensitivity associated with WMS. It will however be readily understood that in other variants approaches different than WMS may be used without departing from the scope of protection, such as for example direct absorption of light at the selected absorption line or Balanced Radiometric Detection (BRD).

Referring back to FIG. 1, in some embodiments, a signal processor SP may be in communication with the photodetector 50 to receive detection signals therefrom and process such signals to extract information relative to the gas analytes. The signal processor SP may be embodied by any device, circuit, computer, or any other system having the computing capability to perform the tasks inherent to the processing of the detection signal to extract and analyse information carried by these signals. In the illustrated example of FIG. 1, the signal processor SP is integrated into the controller 44. It will be readily understood that in other examples, the signal processor may be a separate device or combination of devices without departing from the scope of protection. Communications between the photodetector 50 and signal processor SP may be direct or indirect, wired or wireless. In some variants, the signal processor may be integrated into the photodetector 50.

Figure 3A:
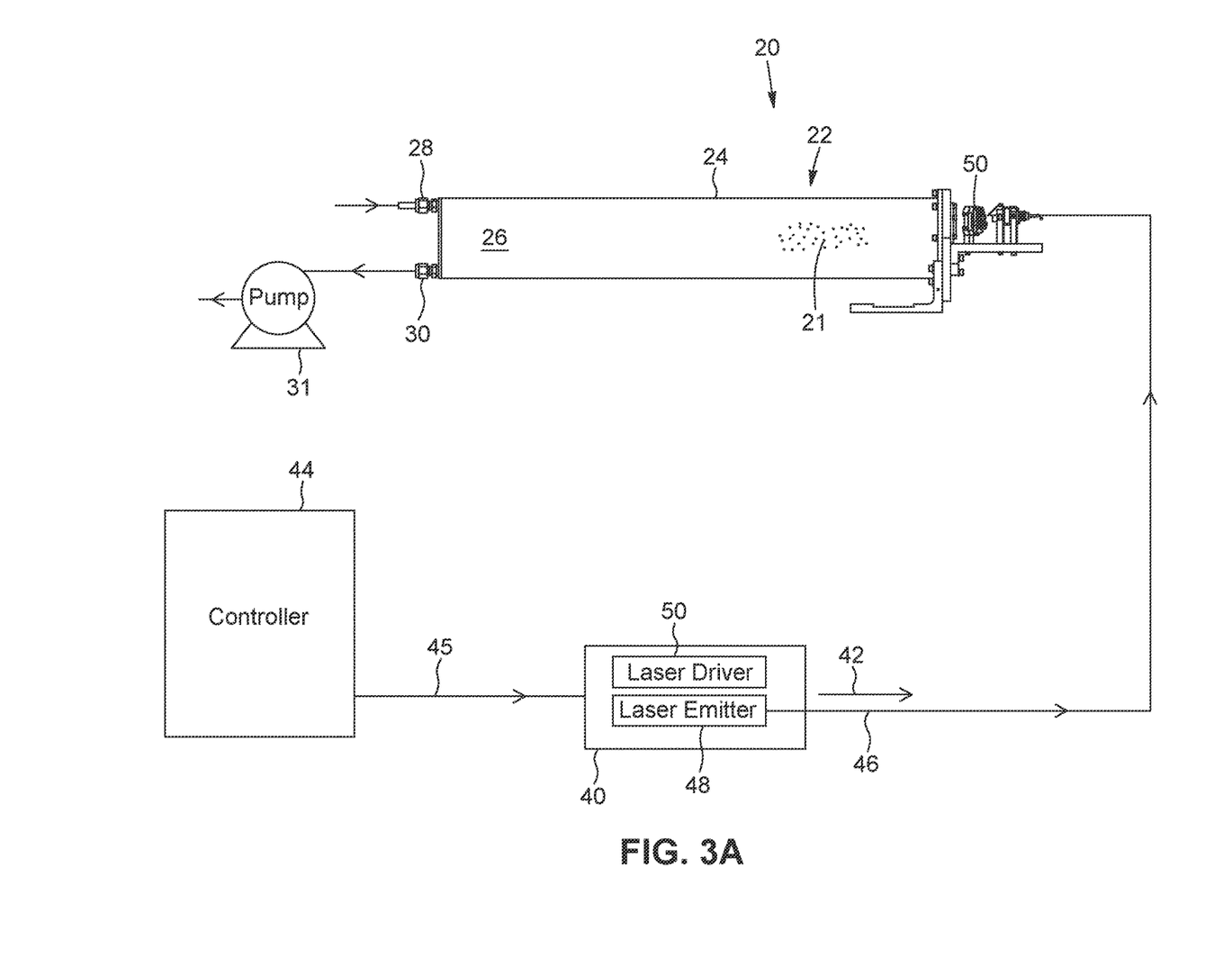
FIGS. 3A and 3B are schematized representations of a gas analyser according to single laser emitter variants.

Referring to FIG. 3A, a more detailed schematized representation of a gas analyser 20 according to one embodiment is shown. In this implementation, the laser module 40 includes a single laser emitter 48 generating the interrogation light beam 42, and a laser driver 50 coupled to the laser emitter 48 to control the parameters of the interrogation light beam 42. The laser emitter 48 may be embodied by any device or combination of devices apt to generate a light beam at the desired wavelength or wavelengths. In some implementations the laser emitter 48 is spectrally tunable. As one skilled in the art will readily understand, "spectral tunability" refers to the ability to change the operation wavelength of a laser emitter over a predetermined spectral range. Examples of tunable laser emitters include distributed feedback lasers, quantum cascade lasers, Vertical Cavity Surface Emitting Laser (VCSEL) and the like. The laser driver 50 is preferably configured to tune the wavelength of the interrogation light beam 42, for example by varying the operation temperature of the laser emitter 48 or the drive current fed to the laser emitter 48.

Figure 3B:
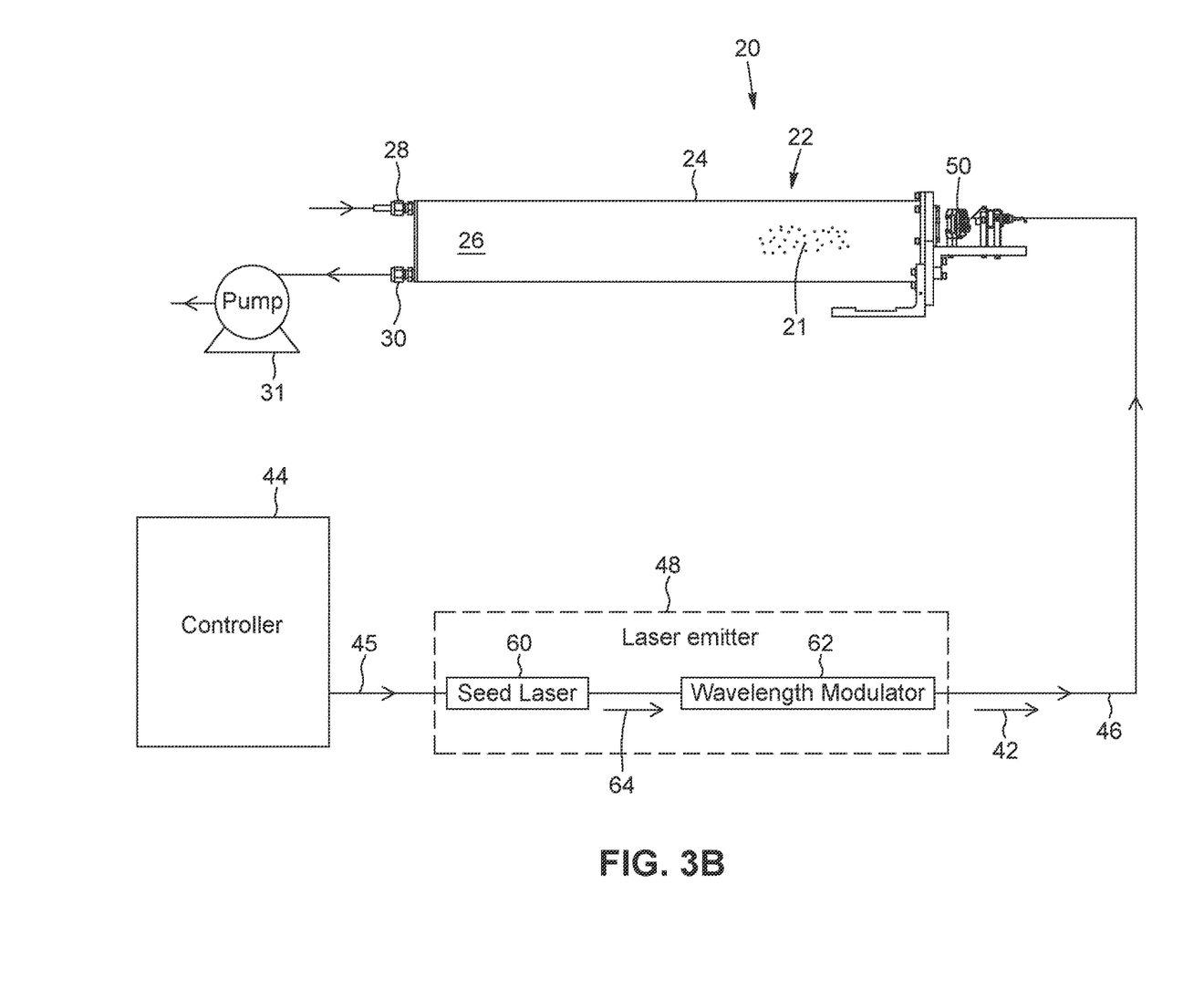

Referring to FIG. 3B, in other implementations, the laser emitter 48 may include a seed laser 60 generating a seed light beam 64 at a given wavelength, combined with an external modulator 62 which is configured to modify the wavelength of the seed light beam 64 so that the interrogation light beam 42 has the desired tunable operation wavelength. The control signals 45 may include signals controlling the operation of the modulator 62.

In accordance with one implementation, the laser emitter 48 is operable within a spectral range encompassing two different operation wavelengths, each associated with an absorption line of a different gas species.

In some embodiments, a first wavelength of the laser emitter 48 corresponds to or is associated with an absorption line of hydrogen sulfide, and therefore represents a selected $H_2S$ absorption wavelength.

As well understood by those skilled in the art, selecting an absorption line or feature of a given gas species preferably takes under consideration several factors. Notably, as can be observed in equation (1) above, the absorbance a of a given line depends on the molecular density N, on the strength S of the line and on the path length l within the cell. For a given path length and molecular density, the selected line is preferably strong enough to provide a readable variation of signal at the detector, while being small enough to avoid oversaturation of the photodetector. The presence or absence of a strong absorption line of another constituent of the same gas sample around the same wavelength is also of interest. As the main constituent of natural gas is methane, it has a high molecular density which leads to high absorbance, and the selected $H_2S$ absorption wavelength should therefore not coincide with a strong methane absorption line. In one example, the absorption line of $H_2S$ at 1574.55 nm may be used. Other examples of absorption lines of hydrogen sulfide that may be used include lines at 1578.13 nm and 1589.76 nm.

In some embodiments, a second wavelength of the laser emitter 48 may correspond to or be associated with an absorption line of carbon dioxide, and therefore represents a selected $CO_2$ absorption wavelength. This operation wavelength is preferably selected so that it is spectrally spaced far enough from the $H_2S$ absorption wavelength to avoid absorption of a light at a same wavelength by both species, while being close enough to be reachable within the tuning range of a same laser emitter. As for the $H_2S$ absorption line, the selected $CO_2$ absorption wavelength should not coincide or overlap with a strong methane line. By way of example, carbon dioxide has an absorption feature at 1574.40 nm which meets these conditions with respect to the 1574.55 nm line of $H_2S$ mentioned above.

In operation, the laser emitter 48 is turned on by sending a control signal 45 from the controller 44 to the laser driver 50. The laser tuning parameters, such as temperature and/or drive current, used to generate the interrogation light beam 42 at a wavelength of 1574.55 nm may be downloaded from the controller 44 to the laser driver 50. In variants using the WMS approach, the laser tuning parameters may modulate the wavelength sinusoidally, at a fixed modulation rate ωm, and over a modulation depth of halfwidth δ. In addition, the amplitude (hence the intensity) may also be modulated. Preferably, the laser emitter is operated in this fashion for a period of time long enough to obtain a stable reading for the concentration of $H_2S$, typically about 5 to 30 seconds. Subsequently, a new set of parameters are downloaded from the controller 44 to the laser driver 50 to switch the wavelength of the interrogation light beam to 1574.40 nm. The laser emitter 48 is then operated around this wavelength for a period of time long enough to obtain a stable reading for the concentrations of $CO_2$, again typically about 5 to 30 seconds. In this way, sequential and alternating measurements of $H_2S$ and $CO_2$ can be achieved using a single laser emitter 48.

Figure 4:
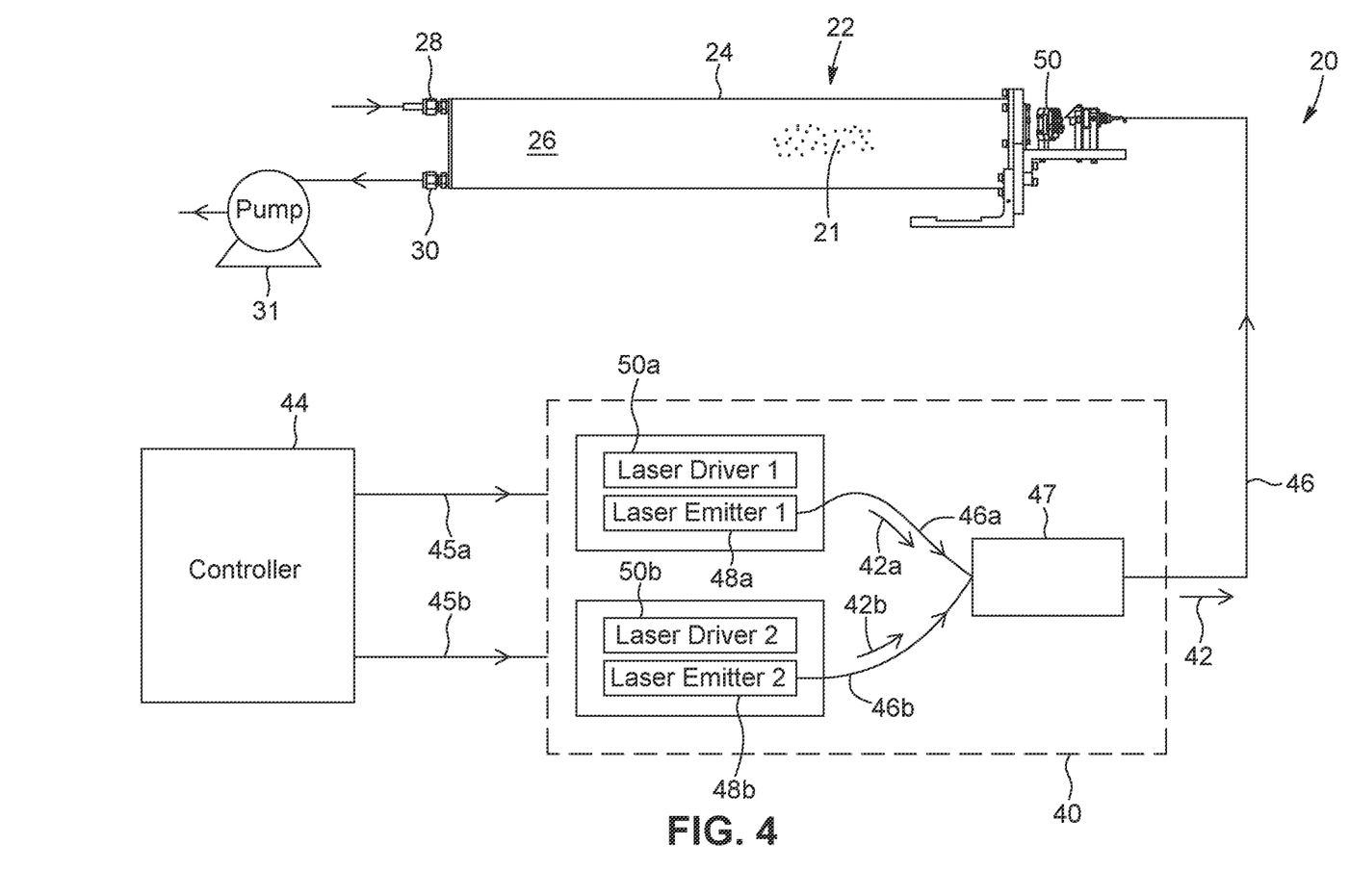
FIG. 4 is a schematized representation of a gas analyser according to a two laser emitters variant.

Referring to FIG. 4, a detailed schematized representation of a gas analyser 20 according to another embodiment is shown. In this implementation, the laser module 40 includes first and second laser emitters 48a, 48b, and associated first and second laser drivers 50a, 50b respectively coupled to the first and second laser emitters 48a, 48b to control the parameters of the light generated thereby. Each laser emitter 48a, 48b may be operable to generate light at a wavelength representative of an absorption line of a different target analyte. Each laser emitter 48a, 48b may be embodied by a Distributed feedback laser, quantum cascade laser, Vertical Cavity Surface Emitting Laser (VCSEL) or the like. The first and second laser emitters may be operable according to a WMS scheme such as described above. For example, the control signals may operate each laser driver 50a, 50b to scan the wavelength of the light generated by the associated laser emitter 48a, 48b, for example by varying the operation temperature of the laser emitter 48a, 48b or the drive current fed to the laser emitter 48a, 48b. In some implementations, the control signals may be configured to modulate the intensity of light from each of the first and second laser emitters 48a, 48b.

The laser module 40 may further include a pair of optical fiber sub-links 46a, 46b, each couple to an output of the corresponding laser emitter 48a, 48b to receive and guide the light beam 42a, 42b generated thereby. A fiber coupler 47 may be provided to combine the output of the optical fiber sub-links 46a, 46b into the optical fiber link 46. The fiber coupler 47 may for example be embodied by a fused fiber coupler, an optical circulator, or the like.

In some embodiments, an operation wavelength of one of the laser emitters (here arbitrarily designated as the first laser emitter 48a) is associated with an absorption line of hydrogen sulfide, this absorption wavelength having been selected according to the principles explained above. In one example, the absorption line of $H_2S$ at 1574.55 nm may be used. Other examples of absorption lines of hydrogen sulfide that may be used include lines 1578.13 nm and 1589.76 nm, as mentioned above.

In some embodiments, the first laser emitter 48a is operable to emit the interrogation light beam at an operation wavelength within a spectral range encompassing an $H_2S$ absorption wavelength and optionally an absorption wavelength of at least one additional contaminant of natural gas, for example $CO_2$, as explained above. The operation wavelength of the second laser emitter 48b may be associated with an absorption line of water vapor. In one example, the strong line of $H_2O$ at a wavelength of 1486.71 nm may be used. This operation wavelength is spectrally spaced from the $H_2S$ operation wavelength such that typical laser emitters cannot be reliably operated to hop from one line to the other. Instead, a "Laser hopping" technique may be used, according to which the fiber optics outputs from both laser emitters 48a, 48b are alternatively fed into the optical coupler 47, to alternatively define the interrogation light beam 42 launched into the gas cell 22. Preferably, the controller 44 sends the respective control signals 45a, 45b to the laser divers 50a, 50b so that while the concentration of water vapor is being measured, the laser emitter 48a associated with $H_2S$ is turned off, only the light beam 42b from the other laser emitter 48b being injected into the gas cell 22. Conversely, while the concentration of $H_2S$ is being measured, water vapor laser emitter 48b is turned off such that only the output from the $H_2S$ laser emitter 48a is carried to the gas cell 22.

It will be readily understood that both the wavelength and the amplitude of the light beam from the first laser emitter 48a and/or the second laser emitter 48b may be modulated as explained above, for example in the context of a WMS modulation scheme.

Still referring to FIG. 4, in one variant the first laser emitter 48a may be tunable to vary the wavelength of the associated light beam 42a between two different operation wavelengths, each associated with an absorption line of a different gas species. For example, the two operation wavelengths may be respectively associated with absorption lines of $H_2S$ and $CO_2$ as explained above with reference to the embodied of FIGS. 3A and 3B. In this manner, the same analyser system 20 may be used to measure all three gas constituents of interest, $H_2S$, $CO_2$ and water vapor.

In accordance with one aspect, there is provided a method for analysing contaminants of a gas sample of natural gas.

The method includes a first step of inserting the gas sample into a chamber of a multipass gas cell. The multipass gas cell may be a Herriott cell or other configurations, such as explained above.

The method next includes a step of propagating an interrogation light beam through the chamber of the multipass cell. The wavelength of the interrogation light beam is controlled to alternately correspond to:

an absorption wavelength of $H_2S$. In some implementations, the $H_2S$ absorption wavelength is one of 1574.55 nm, 1578.13 nm and 1589.76 nm. As explained above, the selection of the absorption wavelength of $H_2S$ is made in accordance with the strength of the absorption line as well as the absence of strong absorption gas of natural gas and other contaminant in the same spectral area; and an absorption wavelength of at least one additional contaminant In some implementations, the at least one additional contaminant includes $CO_2$, and the absorption wavelength of $CO_2$ is 1574.40 nm. Alternatively or additionally, the at least one additional contaminant may include $H_2O$, and the absorption wavelength of $H_2O$ is 1486.71 nm.

Concurrently to the controlling of the wavelength of the interrogation light beam, the method involves detecting the interrogation light beam after multiple passes across the chamber, thereby obtaining detection signals. The method finally includes processing said detection signals to obtain information about concentrations of $H_2S$ and of the at least one additional contaminant in the gas sample.

In embodiments wherein the additional contaminant includes $CO_2$, the step of controlling a wavelength of the interrogation light beam may include, sequentially:
 a. operating a laser emitter according to laser tuning parameters selected to generate light at the $H_2S$ absorption wavelength; and
 b. operating the laser emitter according to laser tuning parameters selected to generate light at the $CO_2$ absorption wavelength.

In embodiments wherein the additional contaminant includes $H_2O$, the step of controlling a wavelength of the interrogation light beam may include, sequentially:
 c. operating a first laser emitter according to laser tuning parameters selected to generate light at the $H_2S$ absorption wavelength; and
 d. operating a second laser emitter according to laser tuning parameters selected to generate light at the $H_2O$ absorption wavelength.

In embodiments wherein the additional contaminant includes both $CO_2$ and $H_2O$, the step of c) controlling a wavelength of the interrogation light beam may include, sequentially, the substeps of:
 a. operating a first laser emitter according to laser tuning parameters to generate light at the $H_2S$ absorption wavelength;
 b. operating the first laser emitter according to laser tuning parameters selected to generate light at a $CO_2$ absorption wavelength; and
 c. operating a second laser emitter according to laser tuning parameters selected to generate light at a $H_2O$ absorption wavelength.

It will b readily understood to any detection scheme providing sufficient sensitivity for a given implementation may be used without departing from the scope of protection. In some variants, the step of c) controlling a wavelength of said interrogation light beam comprises imposing a sinusoidal modulation on the wavelength, and a WMS detection scheme may be used, as explained above.

By way of example, a typical sequence to measure all three analytes would be as follows:

1. The first laser emitter 48a is turned on by sending a command signal 45a from the controller 44 to the associated laser driver 50a. Simultaneously, the second laser emitter 48b is turned off by sending a command signal 45b from the controller 44 to the associated laser driver 50b.

2. Laser tuning parameters (typically temperature and/or drive current) used to generate light at a wavelength of 1574.55 nm are downloaded from the controller 44 to the laser driver 50a of the first laser emitter 48b, so that the absorbance and thus concentration of $H_2S$ can be measured. These parameters may be maintained for a period of time long enough to obtain a stable reading for the $H_2S$ concentration, for example about 5 to 30 seconds.

3. A new set of parameters (typically temperature and/or drive current) are then downloaded from the controller 44 to the laser driver 50a of the first laser emitter 48b, leading to the generating of light at a wavelength of 1574.40 nm so that the absorbance and thus the concentration of $CO_2$ can be measured. These parameters may be maintained for a period of time long enough to obtain a stable reading for the $CO_2$ concentration (5 to 30 seconds). In this manner, sequential and alternating measurement of $H_2S$ and $CO_2$ can be achieved using a single laser emitter.

4. The second laser emitter 48b is turned on by sending a command signal 45b from the controller 44 to the laser driver 50b associated with the second laser emitter 48b. Simultaneously the first laser emitter 48a is turned off by sending a command 45a from the controller 44 to the associated laser driver 50a. The second laser emitter 48b is tuned to a wavelength of 1486.71 nm. The second laser emitter 48b stays on for a period of time long enough to obtain a stable reading for the $H_2O$ concentration.

5. The entire sequence may repeated such that sequential and alternating measurements of $H_2S$, $CO_2$ and $H_2O$ can be obtained.

In accordance with one aspect, the selection of the operation wavelengths takes under consideration the optical path length within the gas cell. Preferably, the optical pathlength may be optimized for maximum sensitivity to $H_2S$, and weaker absorption lines for $CO_2$ and $H_2O$ are preferably used.

Of course, numerous modifications could be made to the embodiment above without departing from the scope of protection.

The invention claimed is:

1. A gas analyser for analysing multiple contaminants in a gas sample of natural gas, the gas analyser comprising:
 a laser module comprising:
  a first laser emitter, operable within a spectral range encompassing a selected $H_2S$ absorption wavelength and a selected $CO_2$ absorption wavelength;
  a second laser emitter, operable within a spectral range encompassing a selected $H_2O$ absorption wavelength; and
  an output optical coupler optically coupled to the first and second laser emitters and configured to output an interrogation light beam;
 a controller configured to send control signals to the laser module, said control signals operating the first and second laser emitters to alternately output, as the interrogation light beam:
  light from the first laser emitter at the selected $H_2S$ absorption wavelength;
  light from the first laser emitter at the selected $CO_2$ absorption wavelength; and
  light from the second laser emitter at the selected $H_2O$ absorption wavelength;
 a multipass gas cell defining a chamber configured to receive the gas sample, the multipass gas cell having a light input optically coupled to the laser module to inject the interrogation light beam inside said chamber, and a light output for extracting the interrogation light beam from the chamber after multiple passes across said chamber; and
 a photodetector operatively connected to the light output of the multipass gas cell to receive the interrogation light beam therefrom.

2. The gas analyser according to claim 1, wherein the selected $H_2S$ absorption wavelength is 1574.55 nm, the selected $CO_2$ absorption wavelength is 1574.40 nm and the selected $H_2O$ absorption wavelength is 1486.71 nm.

3. The gas analyser according to claim 1, wherein each of the first and second laser emitter is one of a distributed feedback laser, a quantum cascade laser and a Vertical Cavity Surface Emitting Laser.

4. The gas analyser according to claim 1, wherein the laser module comprises first and second laser drivers respectively coupled to the first and second laser emitters.

5. The gas analyser according to claim 1, wherein the control signals are configured to scan a wavelength of the first and second laser emitters across the selected absorption wavelength.

6. The gas analyser according to claim 1, wherein the control signals are configured to modulate an intensity of light from the first and second laser emitters.

7. The gas analyser according to claim 1, comprising an optical fiber link guiding the interrogation light beam from the laser module to the multipass gas cell, and wherein the laser module comprises first and second optical fiber sub-links respectively connecting the first and second laser emitters to the output optical coupler.

8. The gas analyser according to claim 1, wherein the multipass gas cell is a Herriott cell.

9. The gas analyser according to claim 1, wherein the photodetector is a photodiode.

10. The gas analyser according to claim 1, further comprising a signal processor in communication with the photodetector and configured to receive detection signals therefrom and process said detection signals to extract information relative a concentration of each of $H_2S$, $CO_2$ and $H_2O$ in the gas sample.

11. A gas analyser for analysing contaminants in a gas sample of natural gas, the gas analyser comprising:
a spectrally tunable laser emitter operable to emit an interrogation light beam at an operation wavelength within a spectral range encompassing a first wavelength corresponding to an absorption wavelength of $H_2S$ and a second wavelength corresponding to an absorption wavelength of an additional contaminant of natural gas;
a controller configured to send control signals to the laser emitter to alternately output light at the first and second absorption wavelengths as the interrogation light beam;
a multipass gas cell defining a chamber configured to receive the gas sample, the multipass gas cell having a light input optically coupled to the laser emitter to inject the interrogation light beam inside said chamber, and a light output extracting the interrogation light beam from the chamber after multiple passes across said chamber; and
a photodetector operatively connected to the light output of the multipass gas cell to receive the interrogation light beam therefrom.

12. The gas analyser according to claim 11, wherein the first wavelength corresponding to an $H_2S$ absorption wavelength is one of 1574.55 nm, 1578.13 nm and 1589.76 nm.

13. The gas analyser according to claim 11, wherein the additional contaminant is $CO_2$, and the second wavelength corresponding to an absorption wavelength of said additional contaminant is 1574.40 nm.

14. The gas analyser according to claim 11, wherein control signals are configured to scan the operation wavelength of the laser emitter across the first or the second wavelength.

15. The gas analyser according to claim 11, wherein the control signals comprise:
i. a first set of laser tuning parameters for modulating the operation wavelength around the first wavelength; and
ii. a second set of laser tuning parameters for modulating the operation wavelength around the second wavelength.

16. The gas analyser according to claim 11 wherein the first and second sets of laser tuning parameters control one of a temperature of the laser emitter and a drive current of the laser emitter.

17. The gas analyser according to claim 11, further comprising a signal processor in communication with the photodetector and configured to receive detection signals therefrom and process said detection signals to extract information relative a concentration of $H_2S$, and of the additional contaminant in the gas sample.

18. A gas analyser for analysing contaminants of a gas sample of natural gas, the gas analyser comprising:
a laser module comprising:
a first laser emitter operable at an absorption wavelength of $H_2S$; and
a second laser emitter operable at an absorption wavelength of an additional gas contaminant;
a controller configured to send control signals to the laser module, said control signals alternately operating the first and second laser emitters to output light at the $H_2S$ absorption wavelength or at the absorption wavelength of the additional gas contaminant as an interrogation light beam;
a multipass gas cell defining a chamber configured to receive the gas sample, the multipass gas cell having a light input optically coupled to the laser module to inject the interrogation light beam inside said chamber, and a light output extracting the interrogation light beam from the chamber after multiple passes across said chamber; and
a photodetector operatively connected to the light output of the multipass gas cell to receive the interrogation light beam therefrom.

19. The gas analyser according to claim 18, wherein the absorption wavelength of $H_2S$ is 1574.55 nm, the additional contaminant is $H_2O$, and the absorption wavelength of said additional contaminant is 1486.71 nm.

20. The gas analyser according to claim 18, wherein the control signals are configured to scan an operation wavelength of each of the first and second laser emitters.

21. The gas analyser according to claim 18, wherein the control signals are configured to modulate an intensity of light from each of the first and second laser emitters.

22. The gas analyser according to claim 18, wherein the control signals control one of a temperature of the laser emitter and a drive current of each of the first and second laser emitters.

23. The gas analyser according to claim 18, further comprising a signal processor in communication with the photodetector and configured to receive detection signals therefrom and process said detection signals to extract information relative a concentration of $H_2S$, and of the additional contaminant in the gas sample.

24. A method for analysing contaminants of a gas sample of natural gas, the method comprising the steps of:
a) inserting the gas sample into a chamber of a multipass gas cell;
b) propagating an interrogation light beam through the chamber of the multipass cell;
c) controlling a wavelength of said interrogation light beam to alternately correspond to:
an absorption wavelength of $H_2S$; and
an absorption wavelength of at least one additional contaminant;

d) concurrently to said controlling of the wavelength of the interrogation light beam, detecting the interrogation light beam after multiple passes across said chamber, thereby obtaining detection signals; and e) processing said detection signals to obtain information about concentrations of $H_2S$ and of the at least one additional contaminant in the gas sample.

25. The method according to claim 24, wherein the $H_2S$ absorption wavelength is one of 1574.55 nm, 1578.13 nm and 1589.76 nm.

26. The method according to claim 24, wherein the at least one additional contaminant comprises $CO_2$, and the absorption wavelength of $CO_2$ is 1574.40 nm.

27. The method according to claim 26, wherein the step of controlling a wavelength of said interrogation light beam comprises, sequentially:
  i. operating a laser emitter according to laser tuning parameters selected to generate light at the $H_2S$ absorption wavelength; and
  ii. operating the laser emitter according to laser tuning parameters selected to generate light at the $CO_2$ absorption wavelength.

28. The method according to claim 24, wherein at least one additional contaminant comprises $H_2O$, and the absorption wavelength of $H_2O$ is 1486.71 nm.

29. The method according to claim 28, wherein the step of controlling a wavelength of said interrogation light beam comprises, sequentially:
  i. operating a first laser emitter according to laser tuning parameters selected to generate light at the $H_2S$ absorption wavelength; and
  ii. operating a second laser emitter according to laser tuning parameters selected to generate light at the $H_2O$ absorption wavelength.

30. The method according to claim 24, wherein the step of c) controlling a wavelength of said interrogation light beam comprises, sequentially, the substeps of:
  i. operating a first laser emitter according to laser tuning parameters to generate light at the $H_2S$ absorption wavelength;
  ii. operating the first laser emitter according to laser tuning parameters selected to generate light at a $CO_2$ absorption wavelength; and
  iii. operating a second laser emitter according to laser tuning parameters selected to generate light at a $H_2O$ absorption wavelength.

31. The method according to claim 30, wherein the $H_2S$ absorption wavelength is 1574.55 nm, the $CO_2$ absorption wavelength is 1574.40 nm and the $H_2O$ absorption wavelength is 1486.71 nm.

32. The method according to claim 24, wherein the step of c) controlling a wavelength of said interrogation light beam comprises imposing a sinusoidal modulation on said wavelength.

* * * * *